Feb. 5, 1952 F. W. KRUEGER 2,584,473
FOOD PROCESSING APPARATUS
Filed July 20, 1948 10 Sheets-Sheet 1

INVENTOR
FRANK W. KRUEGER
BY *Lyon & Lyon*
ATTORNEYS

Feb. 5, 1952 F. W. KRUEGER 2,584,473
FOOD PROCESSING APPARATUS
Filed July 20, 1948 10 Sheets-Sheet 4

INVENTOR
FRANK W. KRUEGER
BY
*Lyon & Lyon*
ATTORNEYS

Feb. 5, 1952 — F. W. KRUEGER — 2,584,473
FOOD PROCESSING APPARATUS
Filed July 20, 1948 — 10 Sheets-Sheet 9

FIG. 11

INVENTOR
FRANK W. KRUEGER
BY Lyon & Lyon
ATTORNEYS

Patented Feb. 5, 1952

2,584,473

UNITED STATES PATENT OFFICE 2,584,473

FOOD PROCESSING APPARATUS

Frank Wilhelm Krueger, Saratoga, Calif., assignor to Food Machinery and Chemical Corporation, San Jose, Calif., a corporation of Delaware Application July 20, 1948, Serial No. 39,772

11 Claims. (Cl. 99—360)

The present invention relates generally to that class of machines or apparatus in the canning art of the type known as cookers, coolers and the like in which food products such as fruit, vegetables, meat, fish and other comestibles, in containers or cans, are subjected to a treating medium for heating, cooling, sterilizing and other effects during their slow and continuous passage through the machine or apparatus; and more specifically, but not necessarily limited thereto, to machines and apparatus of this specified type wherein the cans in such passage are devoid of rotation and there is desired heat penetration along the longitudinal axes of the cans.

Certain aspects of the present invention may be present in either a so-called "horizontal" type of cooker, cooler, exhaust box and the like of the type shown in my copending U. S. patent application Serial No. 39,773 filed on even date herewith wherein the cans in such passage are rotated alternately in opposite directions about their axes or in a vertical type of cooker or cooler shown herein wherein there is desired heat penetration along the longitudinal axes of the cans.

For the sake of simplicity and convenience, the present invention is described with reference to cookers and coolers though it is understood that the invention is not limited thereto, since certain aspects thereof are applicable generally to machines and apparatus, in the canning art, through which cans are carried for the purpose of treating their contents by the use of a suitable treating medium. Further, while the apparatus shown herein is of the closed or pressure type, certain aspects of the invention embodied in such apparatus may likewise be embodied in apparatus of the open or atmospheric type.

Further, even though the apparatus described herein is shown specifically in relationship only to cooker and cooler apparatus of the so-called vertical type in which the can inlet and can outlet of the apparatus are necessarily spaced from one another in the vertical direction, it is understood however that certain constructional features herein may be utilized in cookers or coolers of the horizontal type as shown in my above mentioned copending application filed on even date herewith. Recourse may be had to the disclosure in my above mentioned copending application in order to more fully understand and appreciate the range of equivalents and scope to which the appended claims are entitled and for that purpose, the disclosure in my above mentioned copending application is incorporated herein by this reference thereto.

While the cooker-cooler arrangement shown in my above mentioned copending application may be used as apparatus of the horizontal type or of the vertical type, depending upon the orientation of the axis of the cylindrical shell enclosing the apparatus, the arrangements disclosed specifically herein are particularly useful in apparatus of the vertical type for the reason that the apparatus incorporates structure whereby the cans in their transit through the apparatus are so supported that room is allowed for expansion of their bulging ends to thereby assure the prevention of removal of the tin coat normally on such bulging ends.

Prior cookers, coolers, and the like, as exemplified in the Thompson U. S. Patent 2,363,818 incorporate a can carrying and guiding means arranged to move cans spirally through such cooker or cooler. In these prior arrangements, the cans are moved essentially only along the inside wall of a cylindrical shell housing those means. In accordance with some aspects of the present invention the cans travel not only adjacent to the inside surface of the cylindrical shell but also move radially inwardly and outwardly from and to the cylindrical shell to utilize more efficiently the interior space of the shell whereby: a longer can path results; the apparatus is more compact to obtain economical use of floor space without sacrifice of an extensive can path; the travel of the cans is smooth; more economical use of the heating medium results.

The cans, in such case, move from the can inlet of the food treatment compartment, shell or chamber to the can outlet thereof in a helicoidal path of a plurality of convolutions, each convolution, in turn, having a plurality of curved adjoining sections, to impart a plurality of zigzag motions to a can in one convolution of travel around the shell.

The present invention relates particularly to machines of this character in which the means for advancing the cans through the cooker or cooler, as the case may be, is composed of a plurality of star wheels which by their relative synchronous rotation, and the association of a directional co-operating canway or can guideway, move the cans successively and continuously from one star wheel to the next to achieve the desired motion.

While the cans are conveyed by a series of rotating star wheels and guided by suitable means in a zigzag path, they are subjected to a steam bath.

It is therefore an object of the present invention to provide an improved apparatus of the character described in which the can capacity per convolution is increased whereby its structure may be made more compact as compared with conventional constructions to thereby obtain the above mentioned advantages.

A specific object of the present invention is to provide an improved cooker which permits the use of a fewer number of units for products requiring long cooking periods, such as fish and meat products.

Another specific object of the present invention is to provide an improved apparatus of the character described which may accommodate in the order of three times as many cans per foot as present day apparatus of the same over-all dimensions.

Another specific object of the present invention is to provide improved apparatus of the character described characterized by the fact that the carrier structure, whereby a serpentine, tortuous, sinuous path of movement is imparted to the cans as they are moved spirally through the apparatus, is of relatively simple construction whose elements may be assembled in an expeditious manner.

Another important specific object of the present invention is to provide apparatus of the character described wherein cans are fed from the can inlet to the can outlet thereof in a helicoidal path having a plurality of convolutions, each convolution comprising a plurality of adjoining curved sections for increasing the length of the spiral path whereby the apparatus may be made compact.

Another object of the present invention is to provide improved apparatus of the character described in which substantially no rotative movement about the axis of a can is imparted to the can in its movement through the apparatus.

Yet another specific object of the present invention is to provide improved apparatus of the character described for the subjection of the cans and their contents to any desired degree of temperature with a minimum amount of heating medium and at the same time to enable the cooking of such contents for any desired length of time.

Still a further specific object of the present invention is to provide a cooker or cooler in which containers move in a serpentine, tortuous or sinuous path whereby the cooker or cooler may occupy a limited floor space.

Yet a further specific object of the present invention is to provide improved apparatus of the character described having a cylindrical outer shell in which containers are moved heliocoidally in the direction of the longitudinal axis of the cylindrical shell with a characteristic tortuous, sinuous or serpentine movement in the radial direction of the shell.

Another specific object of the present invention is to provide an improved apparatus of the character described in which cans are handled in their movement therethrough in such a manner as to minimize the possibility of the removal of the tin coating normally present on the exterior of such cans, particularly the ends of the cans which usually bulge out when heat is applied to the contents of the can.

Still another important specific object of the present invention is to provide improved apparatus of the character described in the treatment of comestibles such as string beans, asparagus and the like.

Yet another specific object of the present invention is to provide improved apparatus of the character described for the subjection of the cans and their contents to any desired degree of temperature with a minimum amount of heating medium and at the same time to enable the cooking of such contents for any desired length of time with substantially no agitation of such contents.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 3:
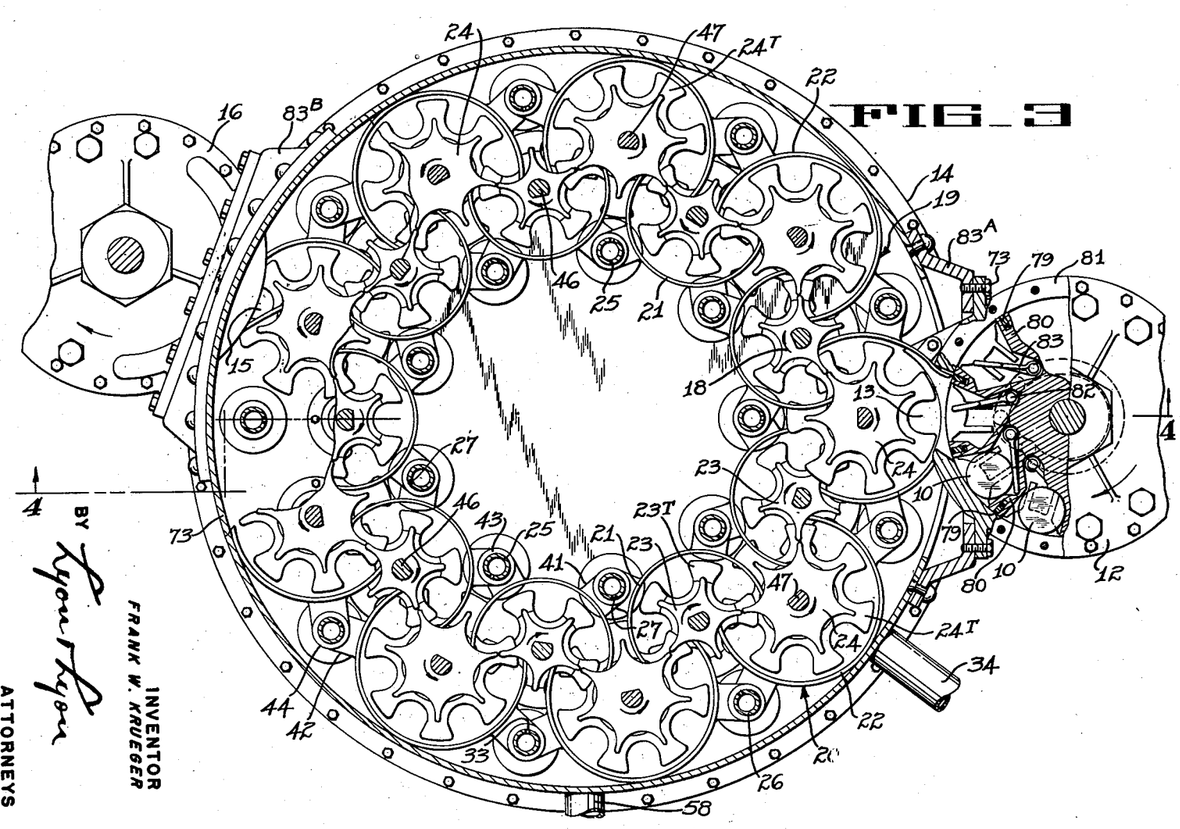
Figure 3 is a view taken substantially on the line 3—3 of Figure 1 showing the transfer valve in elevation.

In the cooker, cooler arrangements shown herein, cans or containers 10 are fed consecutively and continuously to the can inlet opening of the rotary feed valve 12 (Figure 3) whose outlet is in registry with the can inlet opening 13 of the cooker 14 from where they are carried in a tortuous, sinuous, or serpentine path, indicated by the arrows 18 by a can carrier 19 having a plurality of helicoidal convolutions embodying important features of the present invention to the can outlet opening 15 of the cooker from where they are transferred by the rotary transfer valve 16 to the inlet of the cooler 17 from where, in turn, they are transferred by a carrier structure of somewhat different structure from that in the cooker 14 to the cooler outlet opening.

While in the cooker 14, the cans or containers 10 are subjected to steam under pressure by virtue of which the contents of the can are cooked, sterilized or otherwise treated in their passage between the inlet opening 13 and the outlet opening 15. These cans are then, in turn, cooled by transferring them, in conventional manner, while still under pressure through the rotary transfer valve 16 to a cooling bath in the cooler 17, as examplified in the Thompson U. S. Patent 1,467,960.

The can carrier 19 in the cooker which includes can propelling means in the nature of star wheels 23, 24 rotatable can tables 23T, 24T and stationary canway or can guide means 20 comprising inner and outer can engaging strips 21 and 22, respectively, extends between the inlet opening 13 and the outlet opening 15 of the cooker. This can carrier 19, Figure 11, in the cooker is of somewhat different construction from the carrier 19A, Figure 12, in the cooler 17; the cans 10 being allowed to fall due to gravity forces acting thereon from can tables 23T, 24T, 23T, etc. in their movement through the cooker while in the cooler the cans are moved upwardly in a more continuous manner on an inclined serpentine support, as is described in greater detail below.

The can carrier 19A in the cooler (Figure 12) comprises star wheels 23A, 24A, stationary canway or can guide means 20A in the nature of inner and outer stationary can engaging strips 21A and 22A, respectively, the stationary inclined serpentine can table 24S arranged to lift a can as it moves therealong and a rotatable can table 23S of the same nature as the can table 23T in the cooker. It is noted that the can carrier 19 in the cooker is identical to the can carrier 19A in the cooler but for the fact that the rotatable can table 24T is replaced by a stationary inclined can table 24S whose edges are at different elevations but in the same plane as the plane of rotation of the adjacent can tables 23S (which correspond to tables 23T in the cooker). But for these differences a detailed description of can carrier 19 may suffice to describe the can carrier 19A. In the complete apparatus, the can carrier means 19, 19A in the cooker and the cooler, respectively, are operated in exact synchronism with the rotary feed valve 12 and rotary transfer valve 16 by chain drives, described later, thus enabling the complete apparatus to be operated as a unit with certainty and safety.

In the cooker, the can guide means, canway, or can guideway 20 (Figures 3 and 11) extending between the inlet opening 13 and outlet opening 15 defines a helicoidal can path having a plurality of convolutions, each convolution being defined on the one hand by curved inner sections 21 and rotatable can table 23T and on the other hand by an adjoining curved outer section 22 and rotatable can table 24T.

Figure 8:
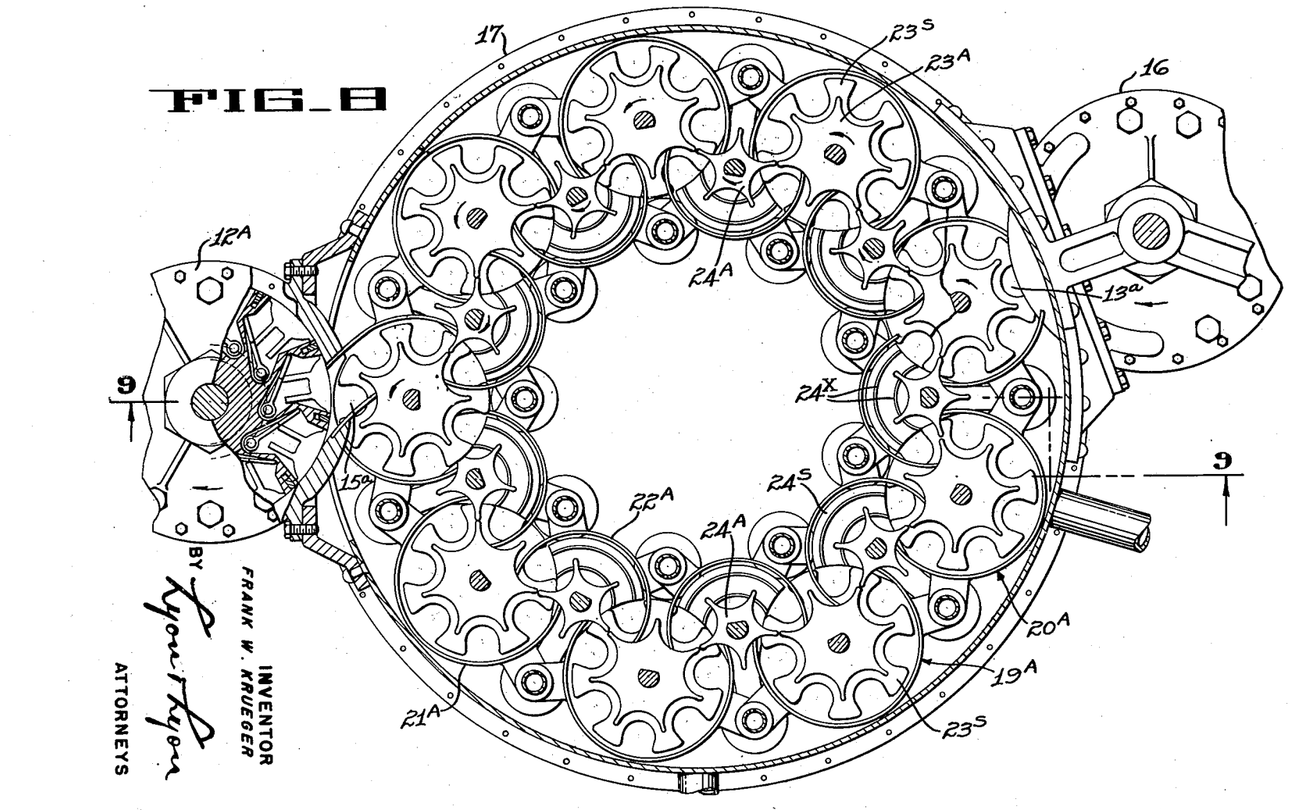
Figure 8 is a sectional view taken substantially along the line 8—8 of Figure 1.
Figure 9:
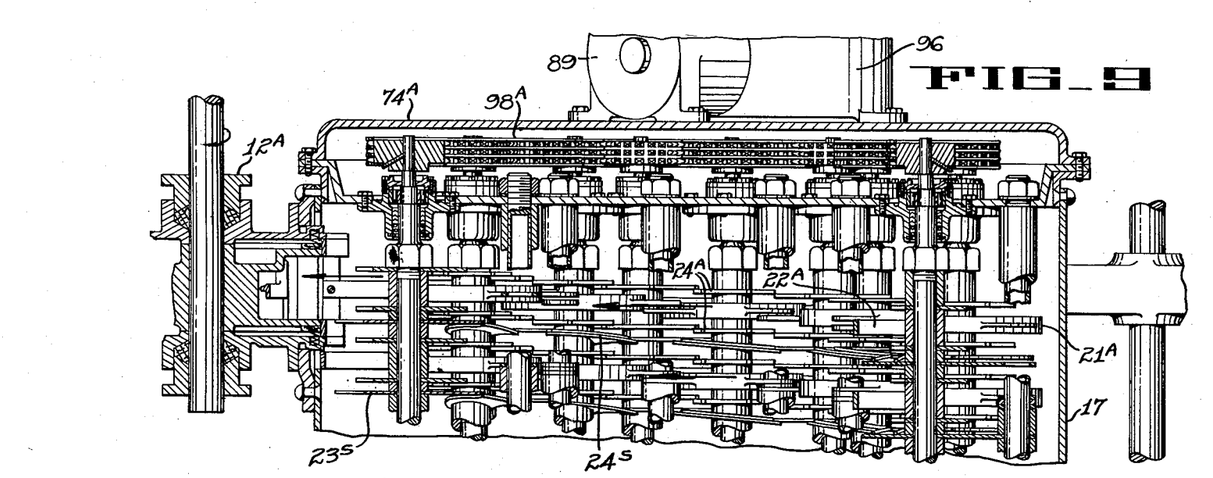
Figure 9 is a sectional view taken substantially along the line 9—9 of Figure 8 illustrating only the upper part of the structure.
Figure 10:
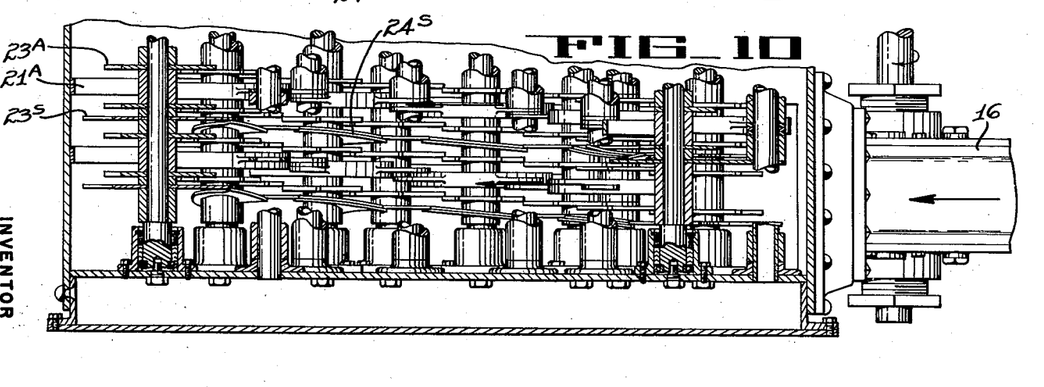
Figure 10 is a sectional view taken substantially along the line 9—9 of Figure 8 but illustrating only the lower part of the structure.

In similar manner, in the cooler, the can guide means, canway, or can guideway 20A (Figures 8 and 12) extending between the can inlet opening 13A and can outlet opening 15A defines a helicoidal can path having a plurality of convolutions, each convolution being defined, on the one hand, by a curved inner section 21A and rotatable can table 23S and on the other hand, by an adjoining curved outer section 22A and stationary inclined can table 24S. In other details, corresponding identical parts in the cooker and cooler have identical reference numerals with the letter A added thereto when such part is in the cooler.

The can propelling means includes a pair of star wheels in each canway section 21, 23T and 22, 24T arranged to engage spaced points on a can and to propel the same, the star wheels in the inner canway section 21, 23T each having the reference numeral 23, and the star wheels in the outer canway section 22, 24T each having the reference numeral 24. It is noted that each one of the outer starwheels 24 has seven can pockets while each one of the inner star wheels 23 has five pockets with the pockets in starwheels 23 located a closer distance to its axis of rotation than are the pockets in starwheels 24, in which case, since all of the starwheels 23, 24 are driven at the same angular speed, a can travels at a greater rate of speed in the inner canway section 21, 21 than it does when traveling in the outer canway 22, 22 and is thus necessarily alternately accelerated and decelerated in its movement from the outer canway section 22 to the inner canway section 21 and back to the outer canway section 22 and so forth. This alternate acceleration and deceleration of a can may cause movement of the liquid contained therein to equalize temperature gradients inside the can.

The pockets in the inner star wheels 23 are of the same size as those in the outer star wheels 24 and are so arranged with respect to one another that corresponding "spokes" thereof are brought into alignment when and as the wheels 23, 24 are rotated in which case such spokes cooperate with the propelled can and the can cooperates with the guideway to shift the propelled can from a pocket within star wheel 23 to a pocket within star wheel 24 and then back to a pocket in the next star wheel 23 and so forth. Because of this cooperation of the guideway in effecting this transfer between pockets in the star wheels and since the star wheels serve as a guiding means, the can carrier 19, as referred to above, includes both the star wheels 23, 24 as well as the can end engaging strips 21 and the corresponding can tables 23T, 24T.

The canway 20 comprising guides 21, 22 is stationarily mounted in the cylindrical cooker on a plurality of stationary inner and outer supporting members 25, 26 serving the dual function of canway section supports and steam tubes. These members 25, 26 extend longitudinally of the cylindrical cooker chamber with their opposite ends fastened to the spaced stationary header or end plates 28, 29 which serve to divide the cooker into three separate fluid tight compartments, namely: a starwheel drive compartment 30; a food treatment compartment 31; and a steam compartment or manifold 32.

Figure 4:
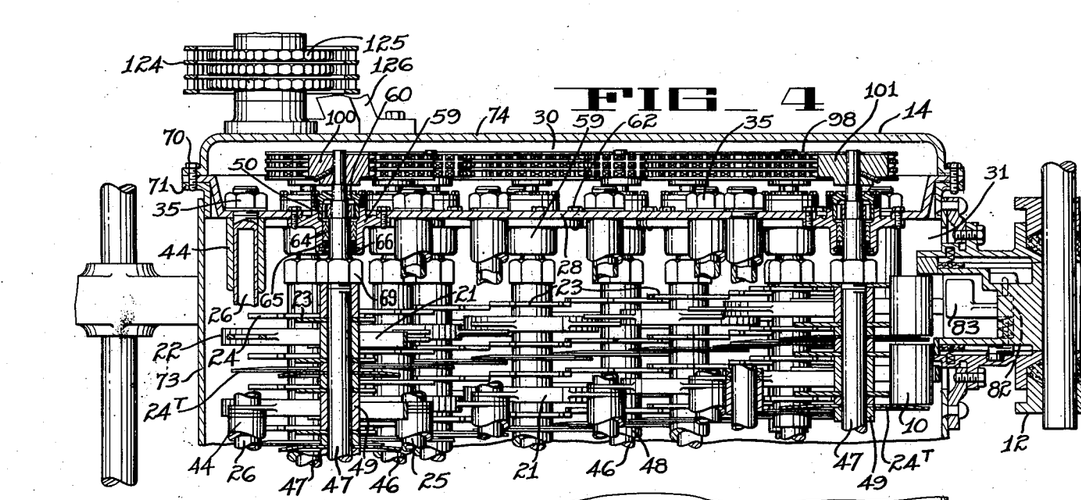
Figures 4 and 5 are sectional views taken substantially along the line 4—4 of Figure 3 illustrating in enlarged form respectively the upper and the lower internal parts of the cooker.
Figure 11:
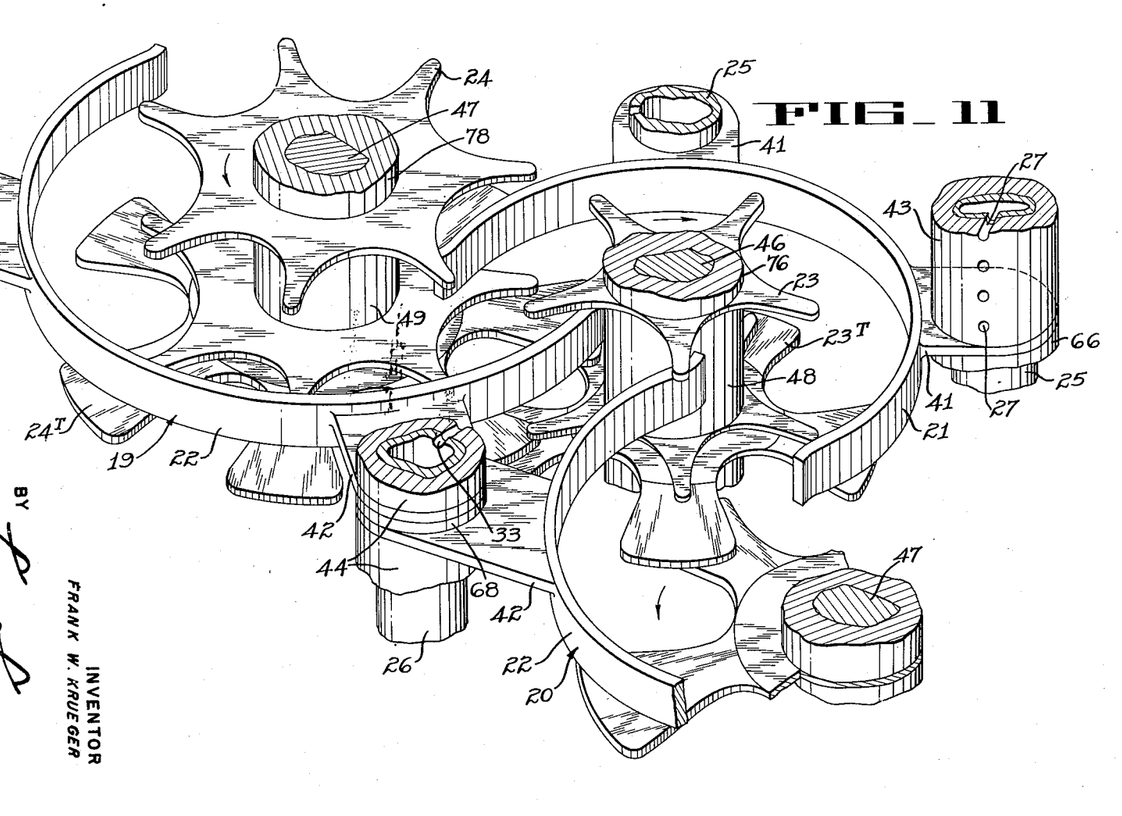
Figure 11 is a perspective view of a descending canway of the right hand cooker unit shown in Figure 1.
Figure 12:
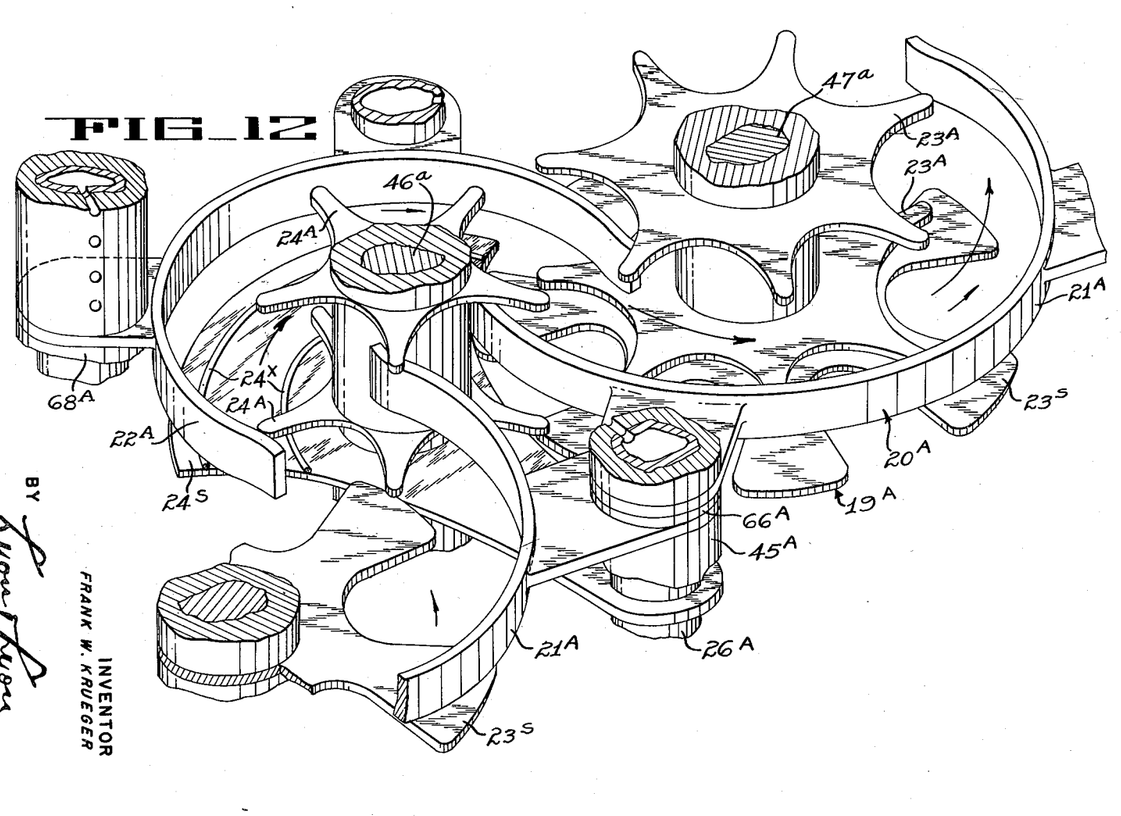
Figure 12 is a perspective view of the ascending canway of the cooler unit shown in Figure 1.

As shown in Figures 4 and 11, these canway supporting members 25, 26 are hollow throughout a major portion of their length to serve as a conduit for the flow of steam supplied from the manifold 32 and steam inlet tube or intake 34 and each has an upper closed screw threaded end passing through an aperture in the header or end plate 28 upon which a fastening nut 35 is mounted. The other ends of the canway supporting members 25, 26 are each provided with a flange 36 fastened thereto by welding, shrink fitting or the like to form a stationary abutment thereon, the flange 36 being affixed near such ends to allow them to project through corresponding apertures in the header or end plate 29 where they may either make a snug fit with the header plate apertures or be welded or brazed thereto. Thus, steam may flow from the manifold 32 to the food treatment compartment 31 through the hollow supporting members 25, 26 each having a plurality of corresponding radial openings 27, 33 spaced along their lengths so that steam enters compartment 31 at a plurality of corresponding positions for achieving uniformity of temperature in compartment 31, it being noted at this time that radial openings 27, 33 are in alignment with corresponding openings in spacers 43, 44 on members 25, 26 respectively.

These supporting tubes 25, 26 as indicated in Figures 4 and 11, pass through the apertures in ears 41, 42, respectively, on strips 21, 22, the ears 41 on the one hand and ears 42 on the other hand being maintained in predetermined spaced relationship by tubular spacers 43, 44, respectively, on tubes 25, 26 and by the corresponding tubular spacers 66a, 68a. The height of spacers 43, 44 corresponds to the height of a can while the height of spacers 66, 68 corresponds to the vertical distance a can is lowered in its passage from a first inner or outer can table 23T, 24T to a corresponding succeeding can table 23T, 24T as the case may be.

The array of spacers 43, 44, 66a, 68a and corresponding ears 41, 42 on guide members 21, 22 are maintained clamped between the stationary flanges or abutments 36 on corresponding supporting members 25, 26 and end plate 28 by the fastening nuts 35 with radial apertures in the tubular spacers 43, 44 and corresponding radial apertures in the tubular supports 25, 26 aligned as shown in Figure 11, to allow the passage of steam into the food treatment compartment 31. Preferably, these apertures are arranged so as not to direct a flow of steam directly onto the cans in the canway but in general to distribute the entering steam evenly throughout the compartment 31. After the heat in the steam is transferred to the cans and their contents, the resulting condensed steam or condensate falls to the bottom of compartment 31 from where it may be withdrawn through the connecting condensate tube 58, shut off valve 61 and a conventional type of condensate relief discharge valve (not shown).

It is noted that, in the cooler, the steam tube 26A (Figure 12), corresponding to tube 26 in the cooker serves not only to support the corresponding inner guide members 21A in spaced relationship but serve also to support in like manner the inclined stationary can table 24S which has at least one apertured ear clamped between spacers 45A so as to maintain opposite ones thereof spaced a distance somewhat greater than the height of a can. If desired, for purposes of rigidity, the table 24S may be provided with additional ears which in like manner may be supported on a pair of outer steam tubes 26.

The inner star wheels 23 (Figures 4 and 11) and outer star wheels 24 together with their corresponding can tables 23T, 24T are mounted in predetermined spaced relationship with respect to one another and to each other on their drive shafts 46, 47, respectively, with corresponding interposed spacers 48, 76 and 49, 78 and with the ends of such shafts 46, 47 journaled for rotation, without end play on the spaced end plates 28, 29. The spacers 48, 49 serve to space the corresponding star wheels 23, 24 a distance somewhat less than the height of a can so that two of such wheels are engageable with a can while the spacers 76, 78 serve to space to corresponding can tables 23T, 24T from the wheels 23, 24. In the cooler, spacers corresponding to spacers 76 are not necessary since there is no corresponding rotatable can table, the can table 24S being stationary. However, if desired, spacers corresponding to spacers 76 may be mounted in corresponding manner on the shaft 46A in the cooler and with the adjacent edges of such spacers forming an annular guide groove within which a portion of the can table 24S may be disposed for increased bracing thereof.

Each star wheel shaft 46, 47 is journaled in bearings 50, 51 mounted on the end plates 28, 29, respectively. The particular type of bearings 50, 51 and their supporting housings may take many different forms and shapes and those shown herein are exemplary of those and are preferred.

The bearing structure 51 on end plate 29 includes an outer ring housing member 52 having a fastening flange for releasably fastening it by bolts 53 thereto in a position determined by the centering pin 54 which is screw threadedly mounted on plate 29 with its conical pointed end extending upwardly into the cooperating conical opening in the end of the star wheel shaft to thereby accurately locate the same in assembly operations. The inner cylindrical member of the thrust ball bearing member 63 is recessed in the end of the star wheel shaft with the outer member of the bearing member 63 snugly received within the housing 52 and with a coil compression spring 55 normally compressing the packing 56 into engagement with the bearing member 63 to form a seal, the spring 55 being seated against the releasable split ring 57 disposed within an annular recess in the housing member 52.

The other bearing structure for the star wheel shaft on end plate 28 includes a needle bearing 50 having its inner annular rotatable portion recessed in a reduced section of the star wheel shaft and its outer movable member engaging both the outer cylindrical housing 59 and a downwardly extending ring on the cap 60 which is releasably secured to the housing 59 by bolts. The housing 59 has an annular flange, which in turn is releasably secured to the end plate 28 by bolts 62. In order to assure a steam-tight seal, packing 64 is pressed in the direction of the needle bearing 50 by the coil compression spring 65 having one of its ends pressing against the packing 64 and the other one of its ends pressing against the split retaining ring 66 releasably mounted in an annular groove in the housing member 59.

Each star wheel shaft 47, 48 has a longtudinally extending flat surface intermediate its ends, as shown in Figures 4 and 11, which cooperates with a corresponding flat internal face on the star wheels 23, 24, can tables 23T, 24T and their tubular spacers threaded thereon to assure turning of these elements when and as the star wheel shafts are driven. In order to prevent longitudinal movement of the star wheels and their spacers on their corresponding drive shaft, the stack of assembled star wheels, can tables, and spacers are maintained pressed as a unit against the shoulder 67 on the star wheel shaft by the fastening nut 69 threaded thereon.

Figure 5:
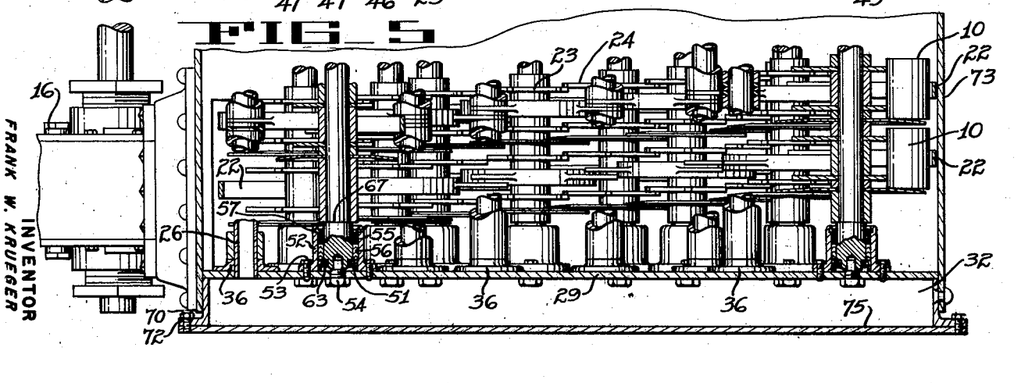

The end plates 28, 29 are releasably secured by bolts 70 to the corresponding flange of the L-shaped ring members 71, 72, respectively, whose diameters are slightly less than the internal diameter of the cylindrical shell 73 housing the canway 20 and project therein, these ring members 71, 72 being secured to the shell 73 by rivets. These end plates 28, 29 are dished or cup-shaped as shown in Figures 4 and 5 and are normally covered by the releasable drive compartment cover 74 and releasable steam manifold cover 75, respectively, which are maintained in position by the same bolts 70.

The cylindrical shell 73 within which the canway 20 and star wheels 23, 24 are thus mounted is supported on the closure member 74, the axis of the shell extending in a vertical direction.

The inlet valve 12 and transfer valve 16 releasably secured to the cylindrical shell 73 by bolts may both be of the type shown in the Thompson U. S. Patent 1,978,656, with longitudinally extending packing plates 79 in grooves on the outer ends of the rotatable valve teeth or fingers 80 and with a crank and roller on rotatable shaft 82, which roller moves in a camway to actuate the shaft 82 and ejector plate 83 attached thereto when it is adjacent opening 13 to discharge a can therein from the corresponding pocket of the rotatable valve, all as explained in Patent 1,978,656. These packing plates 79 cooperate with the inner cylindrical face of the valve housing 81 to form a steam tight seal. The desirability of such a steam tight seal, especially between the cooker and cooler, is made manifest upon the following considerations.

The inlet and transfer valves 12 and 16 respectively, are each removably mounted on the cylindrical housing 73 by bolts passing through ears integrally formed thereon with their ends screw threaded in flanges on bracket members 83a, 83b, respectively, which in turn are riveted to the cylindrical housing 73. The rotatable shaft of each one of these rotary valves 12, 16 has keyed thereto a corresponding sprocket wheel 84, 85. The sprocket wheel 84 is driven by a chain 86 passing in turn over the sprocket wheel 87, the sprocket wheel 85, the sprocket wheel 90 driven by motor 89 through gear reduction unit 96, sprocket wheel 84A on the rotatable shaft of the rotary outlet valve 12A of the cooler, and back to the wheel 84 in an endless path. Sprocket wheel 87 has its shaft 88 journaled for rotation on the cover member 74 (Figure 2A), and coupled to the star wheel drive to provide a driving connection to the star wheel drives and rotatable can tables in the cooker and cooler driven respectively by the sprocket wheels 122, 122A over which the endless driving chain 124 passes, as well as over the sprocket wheel 125 on the same shaft 88 as is the sprocket wheel 87.

Shaft 88 is supported for rotation at its lower end in the cup-shaped bearing member 125 and at a point intermediate its end on bracket member 126, the bearing members 125a, 126 being supported on cover member 74.

Figure 1:
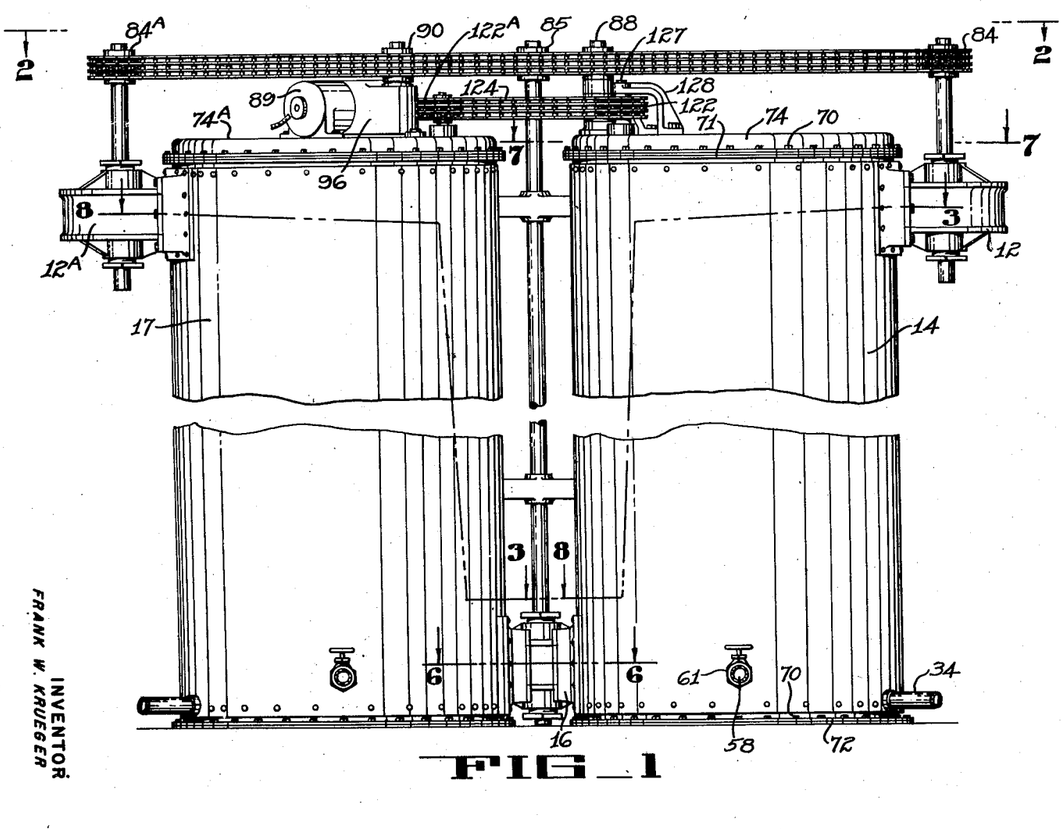
Figure 1 is a view in side elevation of a vertical cooker-cooler arrangement embodying the present invention.
Figures 2, 2A, 2B:
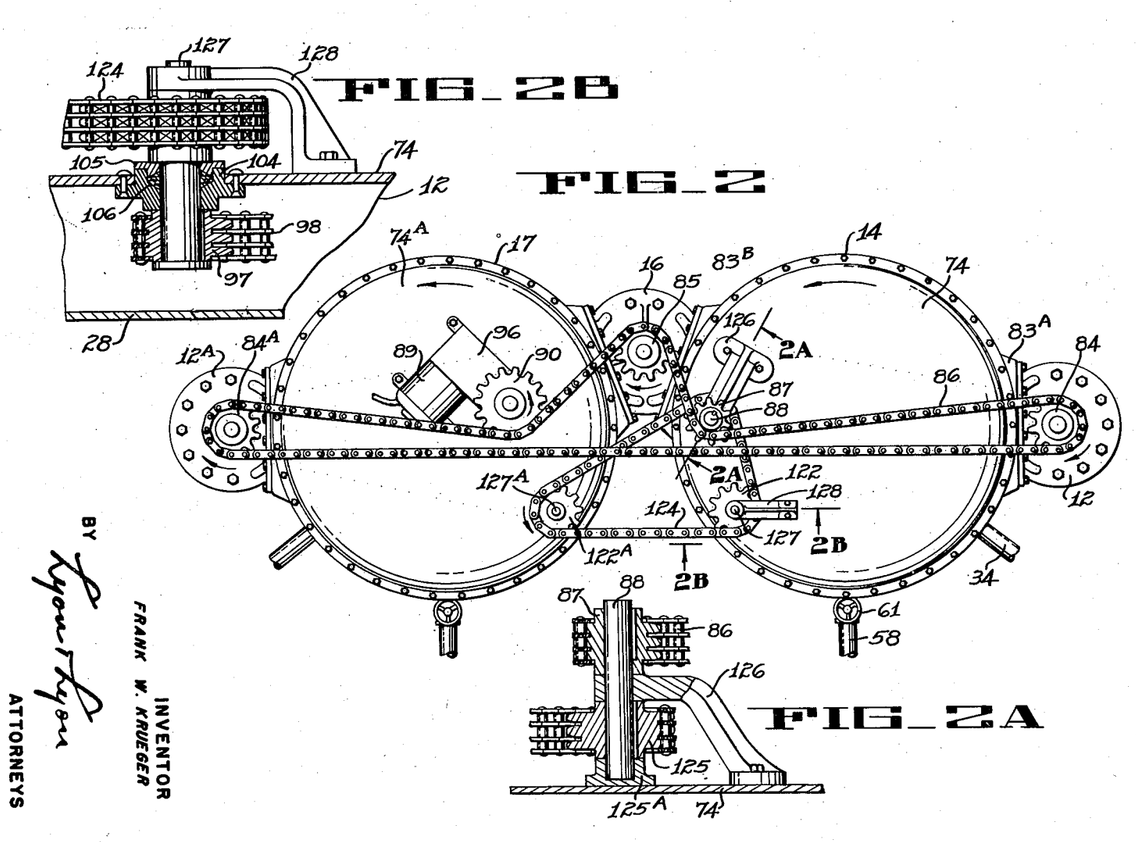
Figure 2 is a plan view thereof taken in the direction indicated by the arrows 2—2 in Figure 1.
Figure 2A is a sectional view taken substantially on the line 2A—2A of Figure 2.
Figure 2B is a sectional view taken substantially on the line 2B—2B of Figure 2.

The sprocket members 122, 122A are rotatably supported on their corresponding cover members 74, 74A, as shown in Figure 2B. The outer end of shaft 127 is journaled for rotation in the free end of bracket member 128 which is releasably secured to the cover member 74 while an intermediate portion of shaft 127 is journalled for rotation in the bearing housing 104 which has an outer closure member 105 arranged to maintain packing material 106 therebetween in contact with the rotatable shaft 127 to form a steam tight seal.

The star wheels and rotatable can tables in both the cooker and cooler are thus coupled as explained in greater detail immediately below with reference to Figure 7, to the corresponding driving sprocket 97, 97A on corresponding shafts 127, 127A through chains 98, 98A, respectively. It is noted again at this time that corresponding or identical parts in the cooker and cooler have identical reference numerals with the letter A appended thereto when the part is in the cooler.

Figure 7:
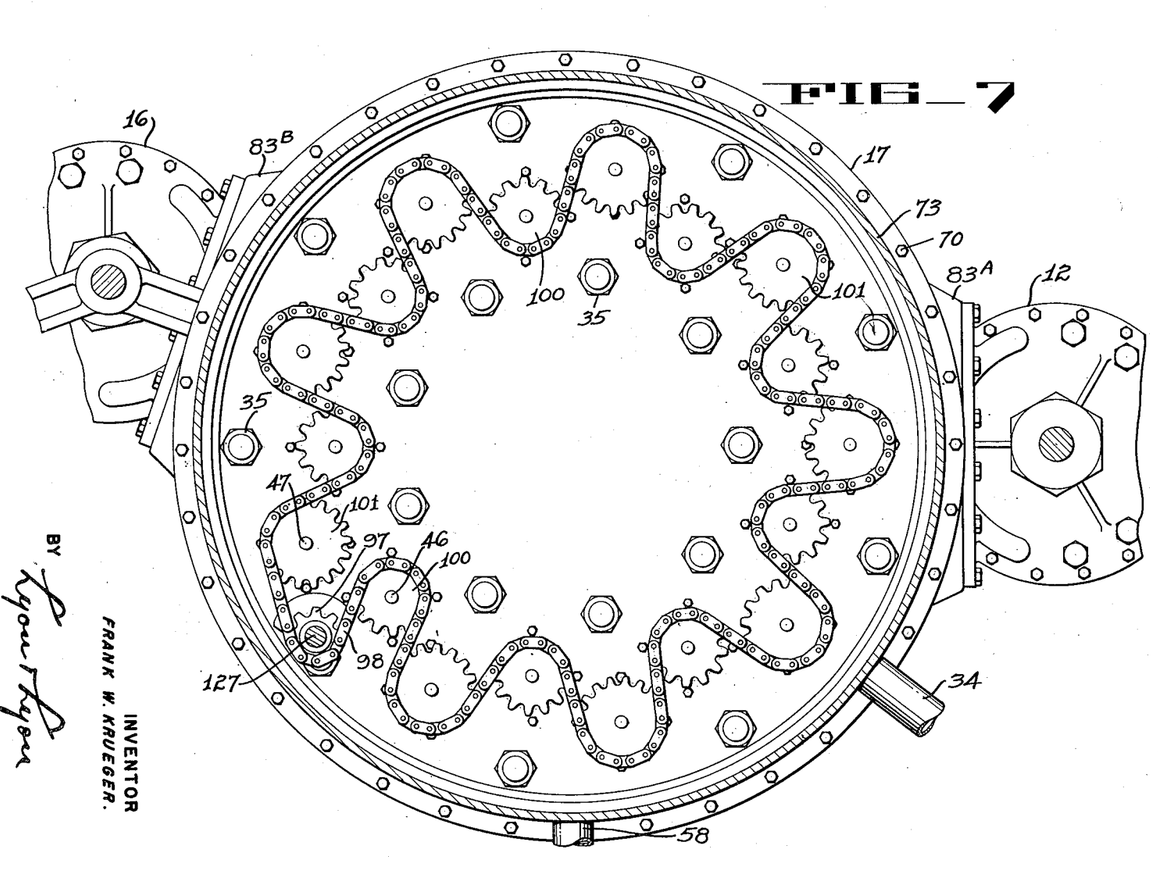
Figure 7 is a sectional view taken substantially along the line 7—7 of Figure 1.

Chain 98, as shown in Figure 7, besides passing over the driving sprocket 97 passes, in turn, over the star wheel drive sprockets 100, 101 keyed respectively on the ends of the inner and outer star wheel drive shafts 46, 47.

The star wheel drive shafts in the cooker and cooler are thus intergeared so that the cans move through the canways in the cooker and cooler at exactly the same average linear speed. Also, the rotary inlet valve 12 and rotary transfer valve 16 are driven so that the pockets in each therein travel at exactly the same speed of movement as the average speed of the cans in the canway of the cooker and cooler.

Figure 6:
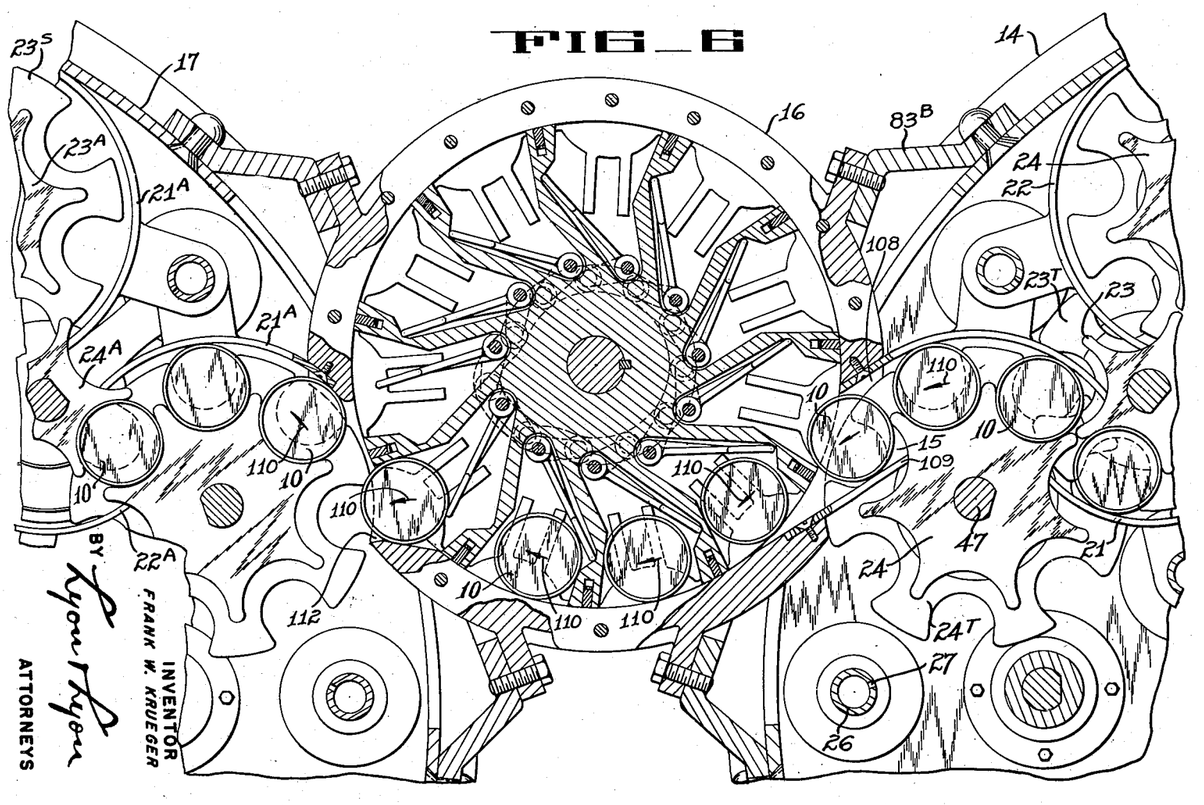
Figure 6 is a sectional view taken substantially along the line 6—6 of Figure 1.

In order to facilitate movements of the cans 10 from the cooker to the valve 16 they are brought into engagement with the stripper plate 109 which is inclined to direct such cans from the cooker canway outlet 15 into the opening 108 and into a pocket of the valve 16. Thus, the cans are successively ejected from the cooker into the pockets of the valve 16 as it reaches the outlet of the cooker and move in the direction indicated by the arrows 110. The stripper plate 109 may have its inner end welded to the stationary housing of valve 16 or fastened thereto by bolts as shown in Figure 6.

Each can is moved by the rotatable wheel of valve 16 in the valve casing through a short space between the outlet of the cooker and the inlet of the cooler at which latter point it is ejected by the cam actuated ejector plates in the manner explained previously and also in the above mentioned Patent 1,978,656 from the pocket of the valve wheel through the inlet opening 112 in the valve casing into the canway in the cooler, and is then moved through the canway in the cooler to the outlet thereof by the can carrier 19A described previously.

Thus, the can cooking and cooling operations may be performed continuously and the cooking and cooling chambers may be tightly closed so that any desired pressure above atmospheric may be maintained therein so that the contents of the cans may be cooked at any desired temperature.

It is apparent that the linear speed of a can through the cooker and cooler may be controlled by controlling the speed of the drive motor 89. For example, the speed of the driving motor 89 may be decreased by conventional means (not shown) when the contents, such as meats, require a longer cooking period.

An important feature characterizing the cooker shown herein resides in the provision of the rotatable can tables in both the cooker and the cooler and the stationary inclined ramps 24S in the cooler. These rotatable can tables are each essentially an enlarged star wheel having adjacent radial fingers spaced to engage circular edges of the can and yet allow the circular ends thereof to bulge out when pressure is developed in the can to thereby prevent abrasion and resulting detinning of the bulging ends. For the same purpose, namely, to avoid detinning of the can ends the inclined ramps 24S have spaced arcuate rails 24X thereon. The rotatable can tables in the cooker are each at different elevations and are progressively of lower elevation in the direction of the path of a can through the canway so that the can in its transit is progressively dropped down from one can table to the next. This drop between can tables is of such distance that this distance multiplied by the number of can tables in one convolution is substantially equal to the height of one can.

While the apparatus shown in my above-mentioned copending application when used as a vertical cooler or cooker may produce gradual upward continuous movement of a can along a spiral inclined plane, the carrier in the cooler in present apparatus accomplishes the same result in a less continuous manner in that upward movement of the cans occur only when traveling on the inclined ramps 24S, movement of the cans on the associated tables 23S being in a horizontal plane.

Thus, the carrier in the cooker, shown herein, is useful when the cans are moved in a descending path. Different structure is used to move the cans in an ascending path.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In apparatus of the character described, the combination comprising a chamber having an inlet and an outlet, and a helicoidal container guideway extending between said inlet and said outlet, said guideway having, in one convolution thereof, a plurality of curved sections, said guideway including rotatable can tables in each one of said curved sections upon which a can rests while being moved along said guideway.

2. In apparatus of the character described, a chamber having an inlet and an outlet, a helicoidal canway extending between said inlet and said outlet and having a plurality of convolutions, each convolution having a plurality of curved sections, and means in each section arranged to engage and to propel cans in said canway, said canway including a rotatable can table in alternate ones of said curved sections upon which a can rests while being propelled, the rotatable can tables in alternate sections being progressively of different elevation, said canway including a curved ramp arranged to elevate cans between alternate rotatable can tables.

3. In apparatus of the character described, the combination comprising a chamber having an inlet and an outlet, and a helicoidal container guideway extending between said inlet and said outlet, said guideway having, in one convolution thereof, a plurality of curved sections, said guideway including alternate stationary ramps and alternate rotatable can tables in corresponding alternate curved sections.

4. In apparatus of the character described, the combination comprising a chamber having an inlet and an outlet, and a helicoidal container guideway extending between said inlet and said outlet, said guideway having in one convolution thereof, a plurality of curved discontinuous sections, with adjoining sections overlying and vertically spaced a greater distance than the height of a container intended to travel therealong to thereby define a corresponding plurality of discontinuous junctions along the path of the guideway at which junctions a container is moved from a higher one of said sections to a lower one of said sections solely by the action of gravity forces acting on said container.

5. In apparatus of the character described, a chamber having an inlet and an outlet, a helicoidal canway extending between said inlet and said outlet and having a plurality of convolutions, each convolution having a plurality of curved sections, a star wheel in each section arranged to engage and to propel cans in said canway, said canway including a rotatable can table in alternate ones of said curved sections upon which a can rests while being propelled, alternate can tables in alternate sections being progressively of different elevation, and inclined ramps disposed between said corresponding ones of said rotatable can tables to raise a can from one can table to the next can table.

6. In apparatus of the character described, a chamber having an inlet and an outlet, a helicoidal canway extending between said inlet and said outlet and having a plurality of convolutions, each convolution having a plurality of curved sections, rotatable means including can carrying means in alternate sections arranged to carry and to propel cans along said canway with the movable can carrying means of said alternate sections being at different elevation, an inclined strip extending between said alternate can carrying means with the terminating edges of said strip at elevation corresponding to the elevation of the adjacent can carrying means, steam tubes within said chamber arranged to support said strip, and spacer means on said steam tube arranged to space adjacent strips of adjacent convolutions at a distance slightly greater than the height of a can.

7. In apparatus of the character described, a chamber having an inlet opening of relatively low elevation within which cans are moved in a general downwardly direction, a helicoidal can guideway having a path extending between said inlet opening and said outlet opening and having a plurality of convolutions, each convolution comprising a plurality of adjoining curved sections, and means located in each section arranged to engage and propel cans along said guideway, said guideway including movable can supporting means located in each one of said sections, said movable can supporting means in adjacent sections being of different elevation to allow such downward movement of a can when a can is transferred therebetween by said propelling means.

8. In apparatus of the character described, a chamber having an inlet and an outlet, a helicoidal can guideway having a serpentine path extending between said inlet and said outlet and having a plurality of convolutions, each one of said convolutions comprising a plurality of adjoining curved sections, and means located in alternate ones of said sections arranged to engage and propel cans along said guideway, said guideway including means supporting cans in said alternate ones of said sections, said supporting means being arranged to elevate a can as it is propelled along said supporting means by said propelling means.

9. In apparatus of the character described, a chamber having an inlet opening of relatively low elevation and an outlet opening of relatively high elevation within which cans are moved in a general upward direction, and a helicoidal can guideway having a path extending between said inlet opening and said outlet opening and having a plurality of convolutions, each one of said convolutions comprising a plurality of curved adjoining sections, said guideway including means arranged to support a can in alternate ones of said sections, said supporting means being arranged simultaneously to elevate a can as it moves therealong.

10. In apparatus of the character described, a chamber having an inlet and an outlet, a helicoidal canway extending between said inlet and said outlet and having a plurality of convolutions, each convolution having a plurality of curved sections, and means in each section arranged to engage and to propel cans in said canway, said canway including a rotatable can table in each one of said curved sections upon which a can rests while being propelled, adjacent rotatable can tables in adjacent sections being progressively of different elevation.

11. In apparatus of the character described, the combination comprising: a chamber having an inlet and an outlet, and a helicoidal container guideway in communication with said inlet and outlet having a central axis with a plurality of convolutions about said central axis, each convolution of said helicoidal guideway having contiguous portions thereof which extend progressively radially inwardly and radially outwardly with respect to said central axis of said helicoidal guideway.

FRANK WILHELM KRUEGER.

REFERENCES CITED

The following references are of record in the file of this patent:

UNITED STATES PATENTS

| Number | Name | Date |
|---|---|---|
| Re 20,530 | Walker | Oct. 12, 1937 |
| 843,893 | Hawkins | Feb. 12, 1907 |
| 1,762,129 | Colbert | June 3, 1930 |
| 2,344,184 | Thompson | Mar. 14, 1944 |
| 2,363,818 | Thompson | Nov. 28, 1944 |